United States Patent [19]

Irvin

[11] Patent Number: 5,832,390
[45] Date of Patent: Nov. 3, 1998

[54] UNTETHERED MICROPHONE AND BASE UNIT

[75] Inventor: David R. Irvin, Raleigh, N.C.

[73] Assignee: Ericsson, Inc., Research Triangle Park, N.C.

[21] Appl. No.: 675,560

[22] Filed: Jul. 3, 1996

[51] Int. Cl.⁶ ............................................... H04B 1/38
[52] U.S. Cl. .................. 455/569; 455/93; 455/550; 455/555; 455/575
[58] Field of Search ................... 455/93, 92, 99, 455/100, 90, 570, 569, 575, 73, 74.1, 554, 555, 550; 381/86, 91, 122, 168

[56] References Cited

U.S. PATENT DOCUMENTS

| | | | |
|---|---|---|---|
| 4,363,935 | 12/1982 | Toya | 379/59 |
| 4,718,080 | 1/1988 | Serrano et al. | 379/59 |
| 4,741,018 | 4/1988 | Potratz et al. | 455/72 |
| 4,873,711 | 10/1989 | Roberts et al. | 455/54 |
| 4,882,745 | 11/1989 | Silver | 455/90 |
| 4,905,270 | 2/1990 | Ono | 455/90 |
| 5,113,428 | 5/1992 | Fitzgerald | 455/90 |
| 5,367,556 | 11/1994 | Marui et al. | 455/90 |
| 5,410,587 | 4/1995 | Grunwell | 455/11.1 |
| 5,426,689 | 6/1995 | Griffith et al. | 379/58 |
| 5,490,203 | 2/1996 | Huang | 379/442 |
| 5,590,417 | 12/1996 | Rydbeck | 455/89 |
| 5,613,222 | 3/1997 | Guenther | 455/89 |

FOREIGN PATENT DOCUMENTS

| | | |
|---|---|---|
| 2210233 | of 1988 | United Kingdom . |
| WO 94/29966 | of 1994 | WIPO . |

Primary Examiner—Donnie L. Crosland
Attorney, Agent, or Firm—Rhodes, Coats & Bennett, L.L.P.

[57] ABSTRACT

The present invention is directed towards an untethered microphone associated with a radio telephone base and adapted to provide wireless communication therebetween. The remote microphone may include a rechargeable battery and a solar power supply and associated panel configured to recharge the battery. The remote microphone and base unit are adapted to each transmit and receive data and control signals therebetween. The remote microphone is further adapted to transmit voice signals from the microphone to the base unit during operation. Typically, a first transceiver is located with the remote unit, and a second transceiver is located with the hands-free base unit. Working together, the transceivers carry the microphone's signals to the radio telephone's transmitter. Additionally, the transceivers carry call-in-progress information back and forth between the microphone and the hands-free base unit.

13 Claims, 4 Drawing Sheets

UNTETHERED MICROPHONE AND BASE UNIT

BACKGROUND OF THE INVENTION

The present invention relates generally to hands-free radio telephone operation and, more particularly, to an untethered microphone for permitting hands-free radio telephone communications.

When a handheld radio telephone, such as a cellular telephone, is operated in a moving vehicle, safety considerations dictate that a hands-free accessory be used. The hands-free accessory often provides a physical entrapment for the portable radio telephone, and, among other features, an external microphone located in a position to pick-up the driver's voice. The physical entrapment for the portable radio telephone is generally described as a cradle. The external microphone is typically attached, clipped, or mounted to the driver's sun-visor or mounted along the windshield or driver window trim.

Electrical signals from the microphone corresponding to the user's voice must be coupled to the radio telephone. Currently, this coupling is made via a cable running between the external microphone and the body of the radio telephone. When a remote microphone cable is used, the cable must be shielded in order to prevent the injection of spurious electrical noise into the radio telephone's audio system. Because of the requirement for shielding, the cable is relatively thick, and therefore unsightly when strung across the interior of the vehicle.

In order to hide the cable, it could be built into the vehicle's structure during manufacture or, as currently done, added by an after-market vendor. Both of these approaches are inherently unsatisfactory. The first is unsatisfactory because of the added manufacturing cost, the problem of stressing the cable whenever the sun-visor is moved, and the problems associated with repairing the cable once installed. The second approach is unsatisfactory because of the consumer's well-founded reluctance to allow an after-market technician of unknown skill to take apart, drill and otherwise modify the vehicle in order to hide the cable.

Thus, there remains a need for a wireless microphone adapted to operate in association with a radio telephone base unit. In order to completely eliminate associated wiring, there is a need for a remote, wireless microphone having its own independent power supply. There is also a need for a rechargeable power supply capable of using solar energy to recharge a battery in the remote microphone in order to avoid having to periodically replace regular batteries.

SUMMARY OF THE INVENTION

The present invention is directed towards an untethered microphone associated with a radio telephone base and adapted to provide wireless communication therebetween. The remote microphone may include a rechargeable battery, a solar power supply, and an associated solar panel configured to recharge the battery. The remote microphone and base unit are adapted to each transmit and receive data and control signals therebetween. The remote microphone is further adapted to transmit voice signals from the microphone to the base unit during operation. Typically, a first transceiver is located with the remote unit, and a second transceiver is located with the hands-free base unit. Working together, the transceivers carry the microphone's signals to the radio telephone's transmitter. Additionally, the transceivers carry control information back and forth between the microphone and the hands-free base unit.

The remote unit is typically mounted on the driver's sun-visor, with the microphone element mounted facing the driver and the solar panel exposed to the sun through the vehicle's windshield. The solar panel trickle-charges the rechargeable battery that supplies power for the remote unit.

Since the remote unit has limited electrical power at its disposal, its power reserves must be conserved. Power preservation is accomplished by configuring the remote unit to have a low-power or deactivated mode when the remote unit is not in use. An actuator is mounted on the remote unit for answering incoming calls and initiating outgoing calls. The actuator is typically used to bring the remote out of a deactivated state to initiate operation. When a ringer mounted on the base unit announces an incoming call, the person receiving the call signals acceptance of the call by switching on the remote microphone unit with the actuator. The remote unit then sends the microphone's output to the base unit via the transceivers on the remote unit and base units. In response, the base unit sends a call-in-progress signal to the remote unit via a return path provided by the transceivers. The receiver at the remote unit is activated periodically to monitor the presence of this signal. In one embodiment, the receiver powers down to save power and periodically awakens to check for the presence of a call-in-progress signal while the transmitter of the transceiver stays on in order to transmit the microphone signal.

When the call ends, the base unit stops sending the call-in-progress signal. The receiver senses the absence of the signal after a few failed attempts to receive it and powers down, having deduced from the signal's absence that the call is over. Alternately, the call acceptance switch or actuator can be made logically bi-stable, and therefore useful to terminate the call and power down the remote unit. This same bi-stable switch can be used by the vehicle's operator to power on the remote unit in preparation for an outgoing call. In such cases, the remote unit will signal the base unit to prepare for an outgoing call.

The transmission of voice, data and control signals may be carried out by a wide variety of analog or digital transmission schemes, such as frequency modulation, amplitude modulation or pulse code modulation. Additionally, a control signal may be as simple as receiving a certain frequency. For example, the call-in-progress signal may be as simple as a single transmitted frequency or as complex as a digitally encoded data stream on an analog carrier.

These and other aspects of the present invention will become apparent to those skilled in the art after a reading of the following description of the preferred embodiments when considered with the drawings.

DESCRIPTION OF THE PREFERRED EMBODIMENTS

Figure 1:
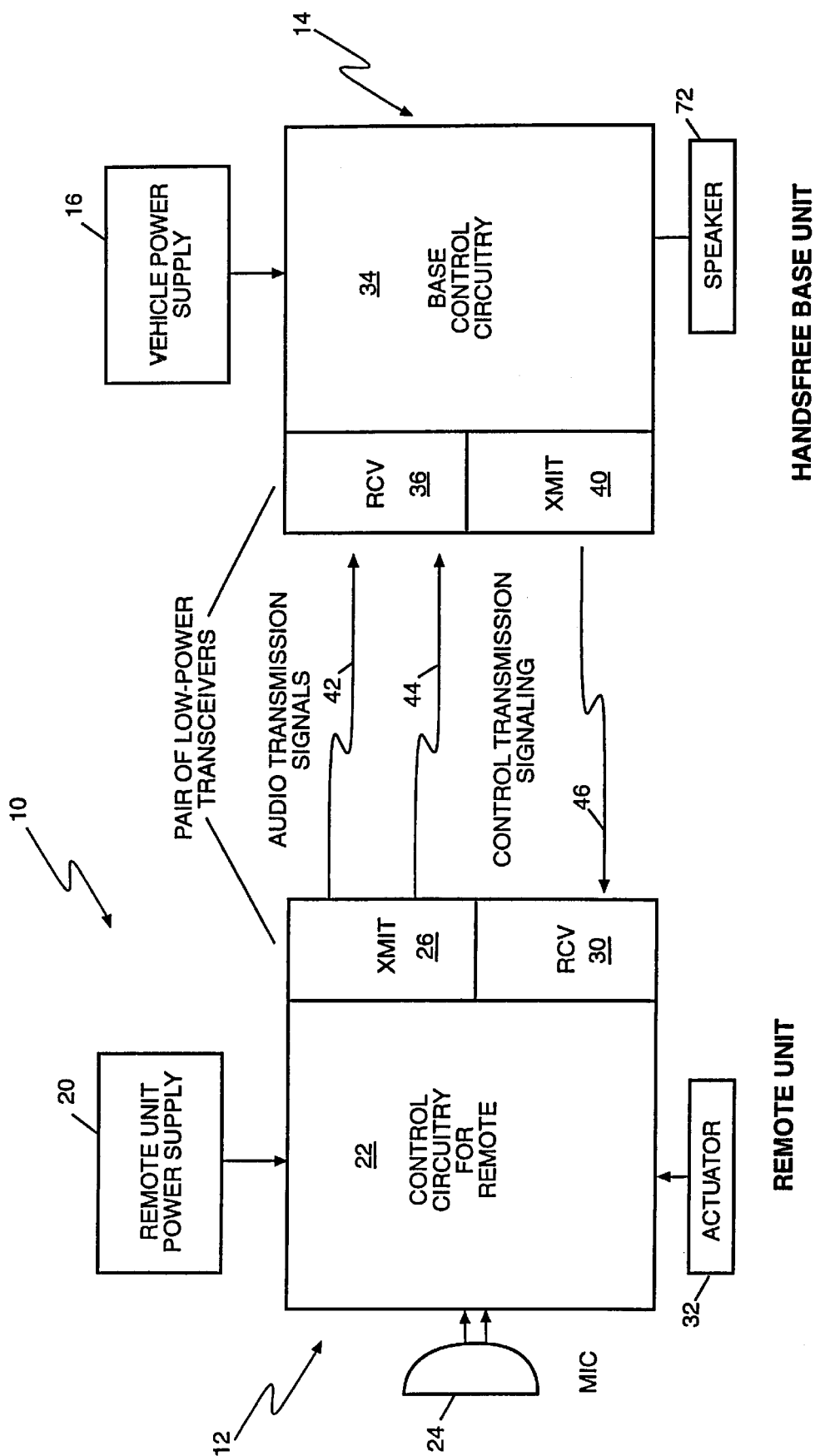
FIG. 1 is a schematic of a remote microphone unit and an associated hands-free base unit constructed according to a preferred embodiment of the present invention.

Referring now to the drawings in general, and FIG. 1 in particular, an untethered, hands-free vehicle communication system, generally designated 10, is shown constructed according to the present invention. The hands-free communication system 10 includes two major sub-systems: a remote microphone unit 12 and a hands-free base unit 14 for providing wireless or untethered communications with the microphone unit 12.

The hands-free base unit 14 is typically mounted to a vehicle and provided power by a vehicle power supply 16. The hands-free base unit 14 may be a cellular telephone base, a cradle configured to receive a radio telephone, or a separate unit configured to operate between a radio telephone and the remote microphone unit 12. In any case, the base unit 14 is configured to provide untethered communications with the remote microphone unit 12. Of course, the base unit 14 in turn communicates with a cellular telephone system or other radio telephone system in a conventional fashion.

The remote microphone unit 12 typically includes a power supply 20, control circuitry 22, a microphone 24, a transmitter 26, a receiver 30 and an actuator 32. The remote unit control circuitry 22 is operatively associated with the microphone 24, transmitter 26, receiver 30 and the actuator 32. When a telephone user invokes hands-free communications, the user will speak into the microphone 24 and typically receive audible communications through a speaker associated with the base unit 14. The microphone 24 converts the user's voice into electrical signals for radio frequency transmission by the transmitter 26. The transmitted microphone signals are designated 42.

The remote unit control circuitry 22 is configured to also provide information signals for transmission to the base unit 14. The transmitted information signals are designated 44. The information signals 44 may include any suitable variety of status, data, or control information. For example, the information signal may be a call initiation signal, a call termination, or a call acceptance signal.

The transmitted microphone signals 42 and the transmitted information signals 44 are received by a base unit receiver 36. The base unit control circuitry 34 directs the received microphone signals 42 for radio communications to a cellular base station of a cellular telephone system in a conventional manner. The base unit control circuitry 34 will also act on the transmitted information signals 44 from the remote unit 12 based upon the content of signals 44. For example, if the information signal is a call initiation signal, the base unit 14 will respond by initiating an outgoing call. Similarly, if the information signal is a call termination signal, the base unit 14 will terminate the call.

The base unit control circuitry 34 and base transmitter 40 are adapted to provide and transmit base information signals, designated 46, to the remote unit 12. For example, a call-in-progress signal is transmitted from the base unit 14 to the remote unit 12 to inform the remote microphone unit that a call is in process.

In sum, the receivers and transmitters for the remote unit 12 and the base unit 14 provide for two-way communication of control information via the information signals 44, 46 and transmission of the microphone signals 42 from the remote unit 12 to the base unit 14.

Figure 2:
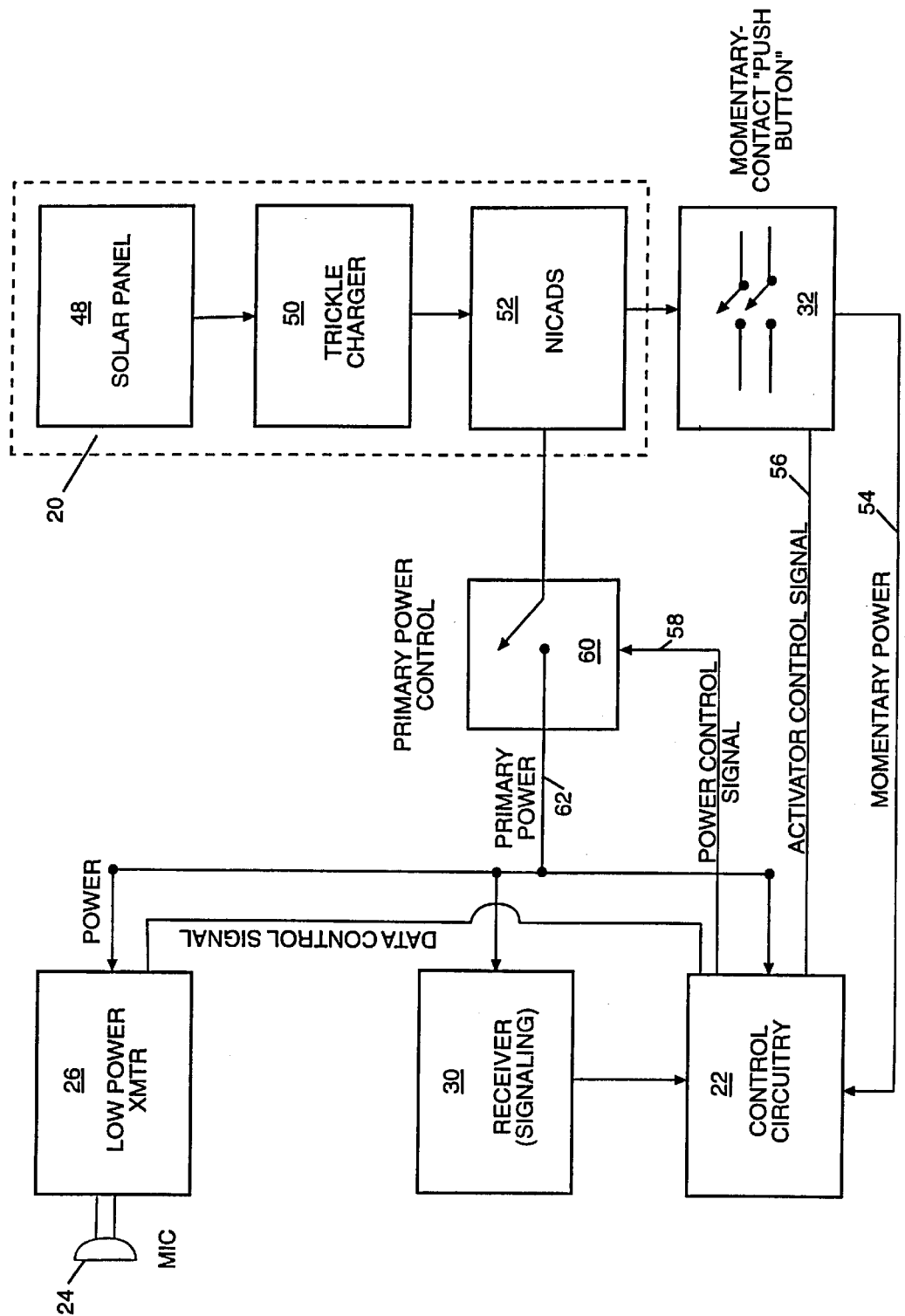
FIG. 2 is a more detailed schematic of the remote microphone unit constructed according to the embodiment of FIG. 1.

Turning now to FIG. 2, there is shown a more detailed schematic of the remote unit 12. In order to provide a truly untethered remote unit 12, the unit must contain its own power supply. Preferably, a battery or system of batteries 52 is used to power the remote unit 12. Preferably, the battery 52 is a nicad battery rechargeable via a trickle charger 50 coupled to a solar panel 48. The solar panel 48 is optimally positioned in order to receive solar energy whenever possible. When solar energy is provided to the solar panel 48, electric power is provided to the battery 52 through the charger 50. Given the automotive application, the solar panel will be a small low-powered panel providing only small amounts of continuous energy. The charger 50 will typically provide only a trickle charge to the battery 52 when solar energy is available. The size of the solar panel 48 and the capacity of the battery 52 are preferably designed so that the battery 52 always has sufficient charge to power the unit during normal operation.

In order to conserve power, the remote microphone unit 12 is normally turned off. The actuator 32 is used to initially "wake-up" the control circuitry 22 by directly providing momentary power along line 54 to the control circuitry 22 from the battery 52. The control circuitry 22 recognizes the "wake-up" signal and sends a power control signal 58 to a primary power control 60. The primary power control 60 directs power from the battery 52 to the various components of the remote unit 12. The primary control 60 may be a mechanical relay or switch, or an electronic switch, such as a bipolar or field effect transistor. Furthermore, there are a variety of integrated circuits which have zero or low power configurations or states. These integrated circuits may include transmitters, receivers, control circuitry, or any combination thereof. The power control signal 58 may also be used to power down the remote unit 12.

When the actuator 32 is pressed, the remote unit's control circuitry transmits a signal to the base unit 14. The actuator 32 may be pressed either to initiate an outgoing call or to answer an incoming call. In response, the base unit 14 sends a call-in-progress signal to the remote unit 12 through the respective transceivers. The receiver 30 at the remote unit 12 operates in conjunction with the control circuitry 22 to monitor for the presence of the call-in-progress signal sent from the base unit 14. As long as the call-in-progress signal is present, the remote unit remains powered on. In a preferred embodiment, the remote unit 12 conserves energy further by having the control circuitry 22 periodically power-on and off the receiver 30 of the remote unit 12. When the receiver 30 is active, the remote unit 12 monitors for the call-in-progress signal.

When the call ends, the base unit 14 stops sending the call-in-progress signal. The control circuitry 22 powers down the various components of the remote unit 12 after sensing the absence of the call-in-progress signal and after a few failed attempts to receive it through the receiver 30. Alternately, the actuator 32 can be made logically bi-stable, and therefore useful to terminate the call and power down the remote unit 12. The actuator 32, in a bi-stable state, can be used by the user to power on the remote unit in preparation for initiating an outgoing call. Once the call is initiated, the call-in-progress signaling will resume as discussed above to keep the remote unit 12 powered during the call.

The actuator 32 may be further configured to provide an actuator control signal 56 to the control circuitry 22. The control circuitry 22 will recognize the actuator control signal 56 and react accordingly. The actuator control signal 56 may be used for a variety of signals, such as turning the remote unit on or off, initiating a call, or terminating a call.

Figure 3:
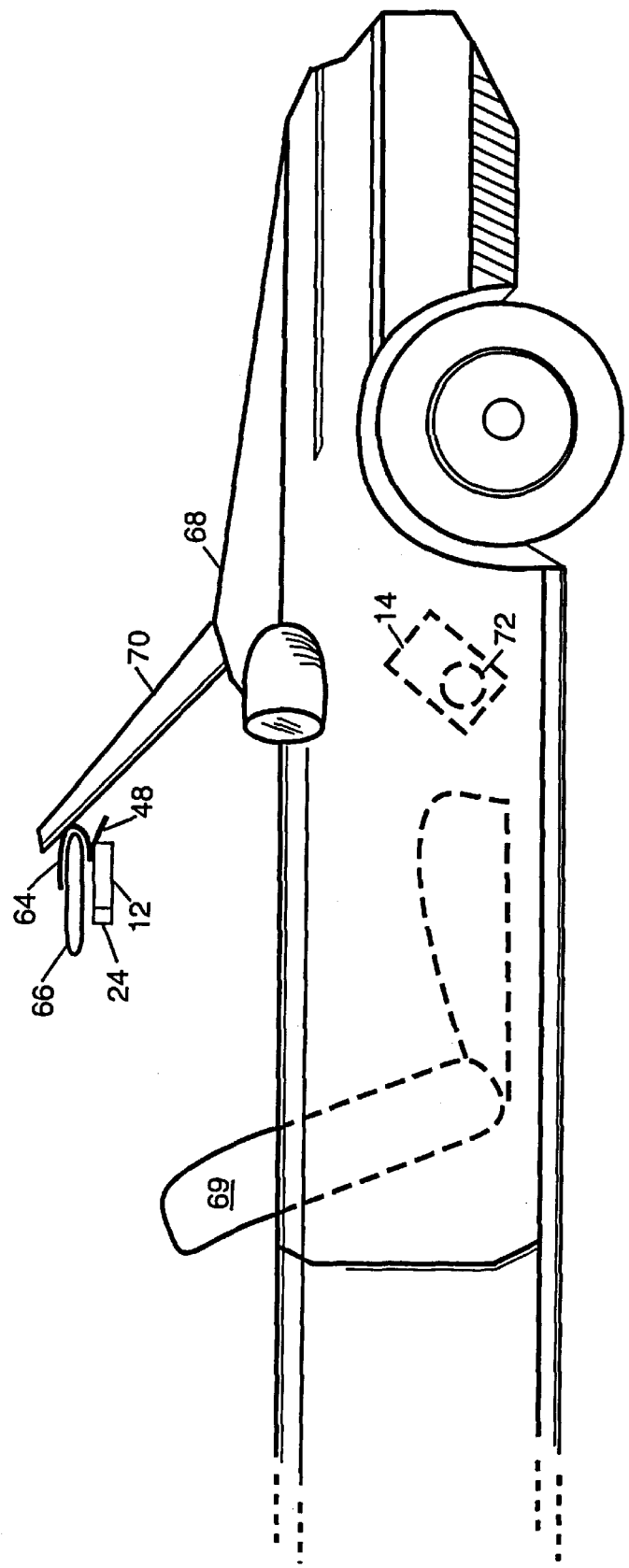
FIG. 3 is a perspective view of the remote microphone unit mounted on a visor of a vehicle.

As best seen in FIG. 3, the remote unit 12 is preferably mounted on a visor 66 of vehicle 68 with a remote unit clip or other mounting bracket 64. The solar panel 48 is positioned to receive sunlight through the windshield 70 while the microphone 24 is directed towards the passenger seated in seat 69. The base unit 14 is mounted near or on the console of the vehicle 68. The base unit 14 is associated with a speaker 72 to enable the user to hear another party during radio telephone communication.

The transmitters and receivers of the remote unit 12 and the base unit 14 are preferably integrated transceivers. Working together, the transceivers of the remote unit 12 and the base unit 14 carry the transmitted microphone signal 42 from the remote unit 12 to the base unit 14 and ultimately to a radio telephone transmitter (not shown) for radio telephone transmission to a cellular tower, satellite or other base station.

Figure 4:
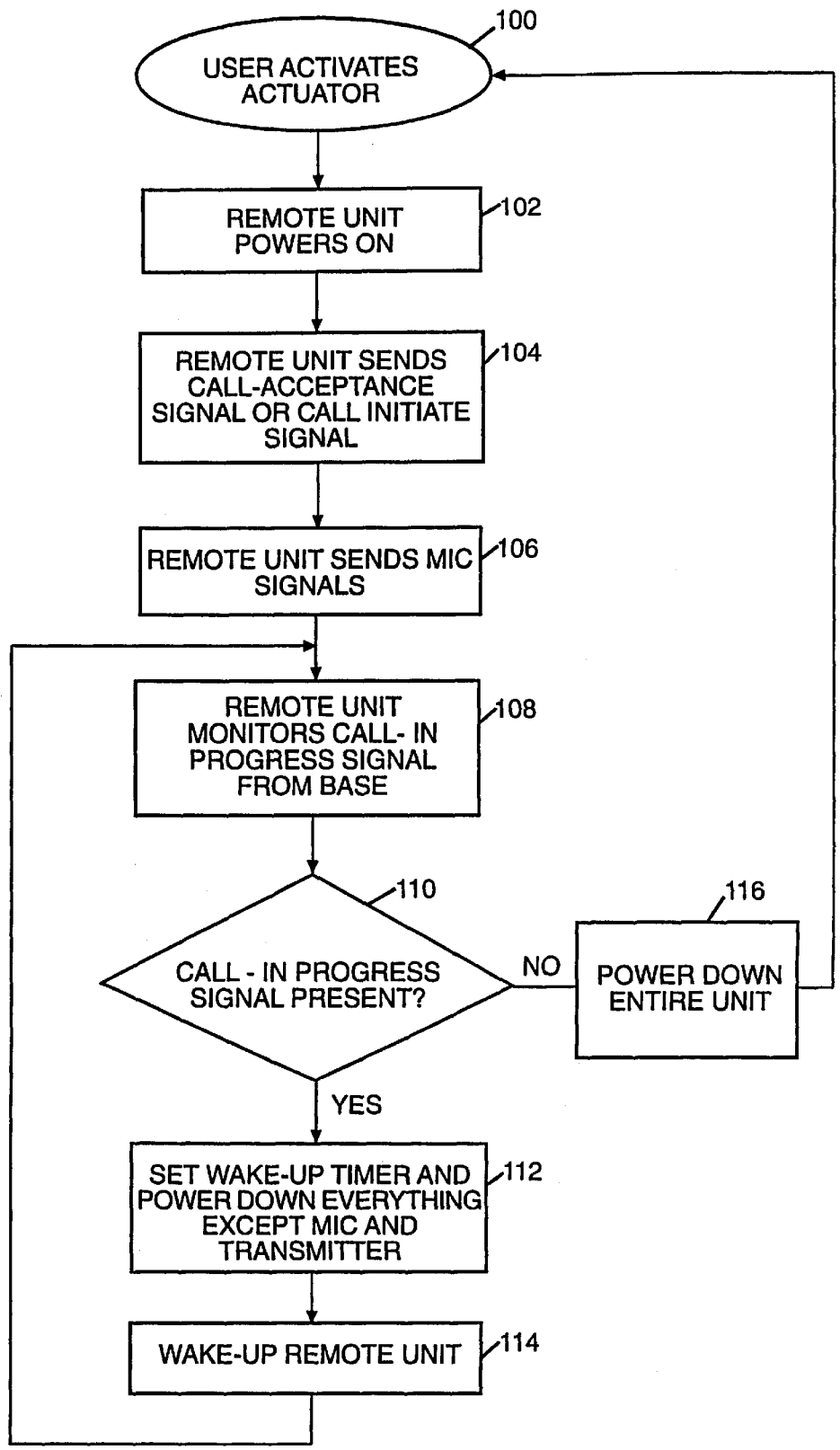
FIG. 4 is a flow chart showing the progress of a call.

Referring now to FIG. 4, the operation of the remote unit 12 will be described in greater detail. In use, a ringer typically signals an incoming call. To accept the incoming call, the user activates the actuator 32 on the remote unit 12 (Block 100). The remote unit 12 powers on (Block 102) and sends a call-acceptance signal to the base unit 14 (Block 104). The remote unit transmits the audio transmission signal 42 to provide a mic-to-base-unit link to carry the user's voice to the base unit for further radio telephone communication (Block 106). Upon receiving the call-acceptance signal (information signals 44), the base unit 14 sends the call-in-progress signal (base information signals 46) to the remote unit 12. The remote unit 12 monitors the call-in-progress signal from the base unit 14 (Block 108). If the call-in-progress signal is received by the remote unit 12, the control circuitry 22 and the receiver 30 will go into a low-power state (Decision 110). Preferably, the control circuitry 22 will power down the receiver 30 and then go into a low-power state. The control circuitry 22 may include an internal clock configured to wake up the receiver 30 periodically (Block 112). Upon wake up, the control circuitry 22 will power on the receiver 30 and listen for the call-in-progress signal from the remote unit (Blocks 114 and 108). The control circuitry 22 will continue this procedure until the call-in-progress signal is not received. If the call-in-progress signal is not received, the control circuitry may fully power down, sleep for another interval and attempt to receive the call-in-progress signal, or go into a time-out procedure. The control circuitry 22 may sleep for a select number of intervals before power down due to the absence of the call-in-progress signal. The control circuitry 22 will eventually completely power down the remote unit 12 if the call-in-progress signal is not received (Block 116).

The remote unit 12 provides various options to terminate a call. The user may terminate a call from the base unit 14 by simply deactivating the base unit. The base unit 14 will cease to broadcast the call-in-progress signal, so the remote unit 12 will power down due to the lack of presence of the call-in-progress signal, as discussed above. Alternatively, the user may contact the actuator 32 to terminate the call. The control circuitry 22 will receive the actuator control signal 52, which may be as simple as a switch closure, and transmit a "call over" signal (information signals 44) to the base unit 14. The base unit 14 will end the call, and the remote unit 12 will power down.

To initiate an outgoing call, the user will preferably activate the actuator 32. The remote unit 12 will power on as discussed above, and signal the base that it is preparing for an outgoing call (information signals 44). Although calls may be initiated from the base unit 14, this would require the receiver 30 of the remote unit 12 to remain powered, or periodically wake up from a low-power state.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A hands-free mobile radio communication system for use in a vehicle comprising:
   (a) a base unit including a transceiver for communicating with a base station in a mobile communication network;
   (b) a speaker associated with said base station;
   (c) a speakerless, untethered microphone unit disposed remotely from said base unit and said speaker, said microphone unit including:
      i) a microphone for producing audio signals;
      ii) a wireless transmitter associated with said microphone and adapted to provide untethered transmission of said audio signals produced by said microphone to said base unit;
      iii) a wireless receiver adapted to receive transmitted control signals from said base unit;
      iv) control circuitry operatively associated with said microphone, said transmitter and said receiver, said control circuitry being responsive to control signals transmitted from said base station to control the operation of said microphone unit; and
      v) a power supply to provide electrical energy to power said untethered microphone unit.

2. The apparatus of claim 1 wherein said power supply comprises a rechargeable battery.

3. The apparatus of claim 2 wherein said power supply includes a solar panel for gathering solar energy from sunlight and converting said solar energy to electrical energy.

4. The apparatus of claim 1 further comprising a mount adapted to mount said untethered microphone unit in the interior of a vehicle.

5. The apparatus of claim 1 further including means for periodically activating said receiver in said microphone unit while a call is in process to monitor said control signals transmitted by said base unit.

6. The apparatus of claim 1 further comprising an actuator operatively associated with said control circuitry, said control circuitry adapted to activate said untethered microphone unit when said actuator is actuated.

7. The apparatus of claim 1 further comprising an actuator operatively associated with said control circuitry, said control circuitry adapted to deactivate said untethered microphone unit when said actuator is actuated.

8. The apparatus of claim 1 wherein said control circuitry is adapted to operate in conjunction with said microphone and adapted to activate said untethered microphone unit when audible information is presented to said microphone to allow voice activated operation.

9. The apparatus of claim 1 wherein said control signals include a call-in-process signal.

10. The apparatus of claim 9 wherein said audio signals are transmitted by said transmitter to said base unit when call-in-process signals are being received by said remote microphone unit.

11. The apparatus of claim 1 wherein said transmitter in said microphone unit is further adapted to transmit control signals to said base unit.

12. The apparatus of claim 11 wherein said control signals transmitted by said microphone unit include a call termination signal.

13. The apparatus of claim 11 wherein said control signals transmitted by said microphone unit include a call initiation signal.

* * * * *